US012240967B2

(12) United States Patent
Park et al.

(10) Patent No.: US 12,240,967 B2
(45) Date of Patent: Mar. 4, 2025

(54) POLYPROPYLENE-BASED COMPOSITE

(71) Applicant: LG Chem, Ltd., Seoul (KR)

(72) Inventors: Sang Eun Park, Daejeon (KR); Eun Jung Lee, Daejeon (KR); In Sung Park, Daejeon (KR); Tae Su Kim, Daejeon (KR); Choong Hoon Lee, Daejeon (KR); Jin Sam Gong, Daejeon (KR); Jung Ho Jun, Daejeon (KR); Rae Keun Gwak, Daejeon (KR)

(73) Assignee: LG Chem, Ltd., Seoul (KR)

( * ) Notice: Subject to any disclaimer, the term of this patent is extended or adjusted under 35 U.S.C. 154(b) by 579 days.

(21) Appl. No.: 17/612,002

(22) PCT Filed: Sep. 28, 2020

(86) PCT No.: PCT/KR2020/013282
§ 371 (c)(1),
(2) Date: Nov. 17, 2021

(87) PCT Pub. No.: WO2021/066491
PCT Pub. Date: Apr. 8, 2021

(65) Prior Publication Data
US 2022/0227981 A1 Jul. 21, 2022

(30) Foreign Application Priority Data
Sep. 30, 2019 (KR) ........................ 10-2019-0121150

(51) Int. Cl.
*C08L 23/12* (2006.01)
*C08F 4/659* (2006.01)
*C08F 210/16* (2006.01)
*C08F 4/6592* (2006.01)
C08L 23/0807 (2025.01)

(52) U.S. Cl.
CPC ............ *C08L 23/12* (2013.01); *C08F 4/6592* (2013.01); *C08L 23/0815* (2013.01); *C08L 2314/06* (2013.01)

(58) Field of Classification Search
CPC .... C08L 23/12; C08L 23/0815; C08F 210/16; C08F 4/6592
See application file for complete search history.

(56) References Cited

U.S. PATENT DOCUMENTS

| | | | |
|---|---|---|---|
| 5,064,802 A | 11/1991 | Stevens et al. | |
| 5,132,380 A | 7/1992 | Stevens et al. | |
| 5,358,792 A | 10/1994 | Mehta et al. | |
| 5,998,039 A | 12/1999 | Tanizaki et al. | |
| 6,492,475 B1 | 12/2002 | Egashira et al. | |
| 6,548,686 B2 | 4/2003 | Nabika et al. | |
| 2002/0013433 A1 | 1/2002 | Nabika et al. | |
| 2003/0171212 A1 | 9/2003 | Nabika et al. | |
| 2009/0005525 A1 | 1/2009 | Lee et al. | |
| 2009/0030221 A1 | 1/2009 | Lee et al. | |
| 2016/0289358 A1 | 10/2016 | Gong et al. | |
| 2018/0208693 A1 | 7/2018 | Sung et al. | |
| 2018/0223014 A1 | 8/2018 | Woo et al. | |
| 2019/0135963 A1 | 5/2019 | Kim et al. | |
| 2019/0211122 A1 | 7/2019 | Lee et al. | |
| 2020/0010657 A1 | 1/2020 | Kim et al. | |
| 2020/0362073 A1 | 11/2020 | Park et al. | |
| 2021/0009793 A1 | 1/2021 | Lee et al. | |
| 2022/0049030 A1* | 2/2022 | Park | C08F 210/14 |
| 2022/0185920 A1 | 6/2022 | Park et al. | |
| 2022/0227981 A1 | 7/2022 | Park et al. | |
| 2022/0315747 A1* | 10/2022 | Park | C08L 23/14 |
| 2022/0325018 A1* | 10/2022 | Park | C08F 210/16 |
| 2022/0403073 A1* | 12/2022 | Park | C08F 2/04 |

FOREIGN PATENT DOCUMENTS

| | | |
|---|---|---|
| CN | 105764976 A | 7/2016 |
| CN | 106661159 A | 5/2017 |
| CN | 109415459 A | 3/2019 |
| CN | 109415546 A | 3/2019 |
| EP | 0575465 B1 | 4/1997 |
| EP | 3456774 A1 | 3/2019 |
| EP | 3936566 A1 | 1/2022 |
| JP | S6333449 A | 2/1988 |
| JP | 2019116570 A | 7/2019 |
| JP | 2019524963 A | 9/2019 |
| JP | 2020-535267 A | 12/2020 |
| JP | 2021-505711 A | 2/2021 |
| JP | 7416353 B2 | 1/2024 |
| KR | 20010052768 A | 6/2001 |
| KR | 20040061926 A | 7/2004 |
| KR | 20170067642 A | 6/2017 |
| KR | 20180051223 A | 5/2018 |
| KR | 20190064337 A | 6/2019 |
| KR | 20190076499 A | 7/2019 |
| WO | 2007078133 A1 | 7/2007 |
| WO | 2016153275 A1 | 9/2016 |

OTHER PUBLICATIONS

Extended European Search Report including Written Opinion for Application No. 20871179.6 dated Jul. 28, 2022, pp. 1-8.
Search Report dated Oct. 20, 2022 from the Office Action for Chinese Application No. 202080038246.1 issued Oct. 28, 2022, 3 pages.
International Search Report for Application No. PCT/KR2020/013282 mailed Jan. 13, 2021, pp. 1-3.

* cited by examiner

Primary Examiner — Rip A Lee
(74) Attorney, Agent, or Firm — Lerner David LLP

(57) ABSTRACT

The present invention relates to a polypropylene-based composite, including (A) polypropylene, and (B) an olefin-based polymer satisfying the following conditions: (1) a melt index (MI, 190° C., 2.16 kg load conditions) is from 0.1 g/10 min to 10.0 g/10 min, (2) a density (d) is from 0.860 g/cc to 0.880 g/cc, and (3) T(90)-T(50)≤50 and T(95)-T(90)≥10 are satisfied, wherein T(50), T(90) and T(95) are temperatures at which 50%, 90%, and 95% are melted, respectively, when fractionating a temperature-heat capacity curve from measurement results by the differential scanning calorimetry precise measurement method (SSA). The polypropylene-based composite of the present invention may show excellent impact strength.

17 Claims, 4 Drawing Sheets

POLYPROPYLENE-BASED COMPOSITE

CROSS-REFERENCE TO RELATED APPLICATIONS

The present application is a national stage entry under 35 U.S.C. § 371 of International Application No. PCT/KR2020/013282 filed on Sep. 28, 2020, which claims priority from Korean Patent Application No. 10-2019-0121150 filed on Sep. 30, 2019, all the disclosures of which are incorporated herein by reference.

TECHNICAL FIELD

The present invention relates to a polypropylene-based composite, and more particularly, to a polypropylene-based composite having improved impact strength and mechanical properties by including a low-density olefin-based polymer introducing a highly crystalline region and showing high mechanical rigidity.

BACKGROUND ART

Generally, as a composition for car interior and exterior material parts, a polypropylene resin composition including polypropylene (PP) as a main component, an impact reinforcing agent and an inorganic filler has been used.

Until the mid-1990s before developing ethylene-α-olefin copolymers polymerized by applying a metallocene catalyst, as car interior and exterior materials, particularly, as materials for a bumper cover, ethylene propylene rubber (EPR) or ethylene propylene diene rubber (EDPM) has been mainly used in most polypropylene-based resin compositions. However, after the appearance of ethylene-α-olefin copolymers synthesized by a metallocene catalyst, the ethylene-α-olefin copolymers have been used as impact reinforcing agents, and at present, become the mainstream. Because polypropylene-based composites using thereof have advantages in having well-balanced physical properties including impact strength, flexural modulus, flexural strength, etc., having good moldability and being cheap in price.

Since the molecular structure of polyolefin such as ethylene-α-olefin copolymers synthesized by a metallocene catalyst is more uniformly controlled than that by a Ziegler-Natta catalyst, molecular weight distribution is narrow, and mechanical properties are good overall. For a low-density ethylene elastomer polymerized by the metallocene catalyst, an α-olefin copolymerization monomer is relatively uniformly inserted in a polyethylene molecule when compared with that by a Ziegler-Natta catalyst, and rubber properties of a low density may be maintained while showing excellent other mechanical properties.

However, there are limitations in securing impact resistance according to diverse utilizing environments, and the development of a polypropylene-based composite which may overcome such limitations is required.

DISCLOSURE OF THE INVENTION

Technical Problem

The task to be solved of the present invention is to provide a polypropylene-based composite which may show markedly improved impact strength properties together with excellent mechanical strength.

Technical Solution

To solve the above tasks, the present invention provides a polypropylene-based composite including (A) polypropylene, and (B) an olefin-based polymer satisfying the following conditions (1) to (3):

1) a melt index (MI, 190° C., 2.16 kg load conditions) is from 0.1 g/10 min to 10.0 g/10 min, (2) a density (d) is from 0.860 g/cc to 0.880 g/cc, and (3) $T(90)-T(50) \leq 50$ and $T(95)-T(90) \geq 10$ are satisfied when measured by a differential scanning calorimetry precise measurement method (SSA), wherein $T(50)$, $T(90)$ and $T(95)$ are temperatures at which 50%, 90%, and 95% of the olefin-based polymer are melted, respectively, when fractionating a temperature-heat capacity curve from measurement results by the differential scanning calorimetry precise measurement method (SSA).

Advantageous Effects

The polypropylene-based composite according to the present invention may show markedly improved impact strength properties together with excellent mechanical strength without using a separate additive by including an olefin-based polymer which introduces a highly crystalline region and shows high mechanical rigidity and at the same time, has excellent miscibility and may be uniformly dispersed in the composite.

BRIEF DESCRIPTION ON DRAWINGS

BEST MODE FOR CARRYING OUT THE INVENTION

Figure 1:
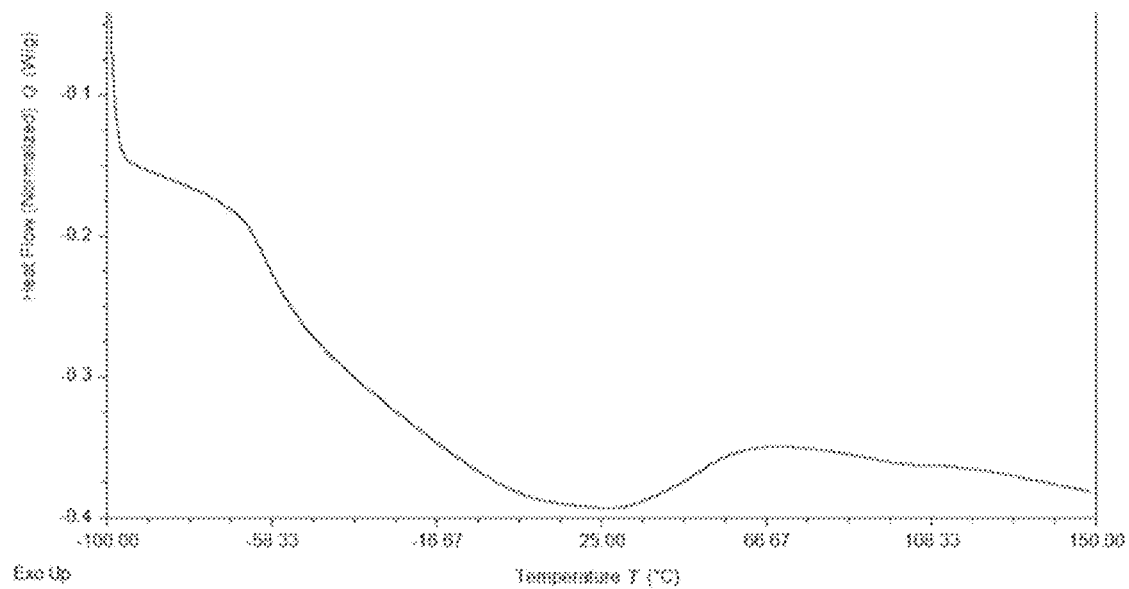
FIG. 1 is a graph showing measured results of a melting temperature using differential scanning calorimetry (DSC) on a polymer of Preparation Example 1.

Hereinafter, the present invention will be described in more detail to assist the understanding of the present invention.

It will be understood that words or terms used in the present disclosure and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The term "polymer" used in the present disclosure means a polymer compound prepared by polymerizing monomers which are the same or different types. The common term "polymer" includes a term "interpolymer" as well as "homopolymer", "copolymer" and "terpolymer". In addition, the term "interpolymer" means a polymer prepared by polymerizing two or more different types of monomers. The common term "interpolymer" includes a term "copolymer" (commonly used to refer a polymer prepared from two different monomers) and a term "terpolymer" (commonly used to refer a polymer prepared from three different monomers). The term "interpolymer" includes a polymer prepared by polymerizing four or more types of monomers.

Generally, polypropylene is used as car interior and exterior materials such as a car bumper, and to supplement the low impact strength of polypropylene, a polyolefin-based polymer is used together as an impact reinforcing material. Above all, in order to show properties of impact resistance, elastic modulus and tensile properties and to achieve high impact strength properties according to various utilizing environments, a low-density polyolefin-based polymer is used. However, in this case, there are problems of rather deteriorating the strength of polypropylene.

In this regard, in the present invention, by using an olefin-based polymer which has excellent improving effects of impact strength and at the same time, which may be uniformly dispersed in a composite due to excellent miscibility with polypropylene when preparing a polypropylene-based composite, markedly improved impact strength properties together with excellent mechanical strength may be shown without using a separate additive.

The polypropylene-based composite according to the present invention includes (A) polypropylene, and (B) an olefin-based polymer satisfying conditions (1) to (3) below.

(1) A melt index (MI, 190° C., 2.16 kg load conditions) is from 0.1 g/10 min to 10.0 g/10 min, (2) a density (d) is from 0.860 g/cc to 0.880 g/cc, and (3) T(90)-T(50)≤50 and T(95)-T(90)≥10 are satisfied when measured by a differential scanning calorimetry precise measurement method (SSA).

Here, T(50), T(90) and T(95) are temperatures at which 50%, 90%, and 95% of the olefin-based polymer are melted, respectively, when fractionating a temperature-heat capacity curve from measurement results by the differential scanning calorimetry precise measurement method (SSA).

Hereinafter, each constituent component will be explained in detail.

(A) Polypropylene

In the polypropylene-based composite according to an embodiment of the present invention, the polypropylene may particularly be a homopolymer of polypropylene, or a copolymer of propylene and an alpha-olefin monomer, and in this case, the copolymer may be an alternating or random, or block copolymer. However, in the present invention, the polypropylene which may be overlapped with the olefin polymer is excluded, and the polypropylene is a different compound from the olefin polymer.

The alpha-olefin-based monomer may particularly be an aliphatic olefin of 2 to 12 carbon atoms, or 2 to 8 carbon atoms. More particularly, ethylene, propylene, 1-butene, 1-pentene, 3-methyl-1-butene, 1-hexene, 4-methyl-1-pentene, 3-methyl-1-pentene, 1-heptene, 1-octene, 1-decene, 1-undecene, 1-dodecene, 1-tetradecene, 1-hexadecene, 1-eicosene, 4,4-dimethyl-1-pentene, 4,4-diethyl-1-hexene, 3,4-dimethyl-1-hexene, etc., may be used, and any one among them or mixtures of two or more thereof may be used.

More particularly, the polypropylene may be any one selected from the group consisting of a polypropylene copolymer, a propylene-alpha-olefin copolymer, and a propylene-ethylene-alpha-olefin copolymer, or mixtures of two or more thereof, and in this case, the copolymer may be a random or block copolymer.

In addition, the melt index (MI) measured at 230° C. and a load of 2.16 kg of the polypropylene may be 0.5 g/10 min to 100 g/10 min, and particularly, the melt index (MI) may be 1 g/10 min to 90 g/10 min, more particularly, 10 g/10 min to 50 g/10 min. If the melt index of the polypropylene is deviated from the range, it is apprehended that defects may be generated during injection molding.

Particularly, in the polypropylene-based composite according to an embodiment of the present invention, the polypropylene may be an impact copolymer having a melt index measured at 230° C. and a load of 2.16 kg of 0.5 g/10 min to 100 g/10 min, particularly, 1 g/10 min to 90 g/10 min, more particularly, may be a propylene-ethylene impact copolymer. The impact copolymer may be included in 50 wt % to 90 wt %, more particularly, 80 wt % to 90 wt % with respect to the total weight of the polypropylene-based composite. In case of including the impact copolymer having such physical properties as polypropylene in the above-described amount range, particularly strength properties low-temperature strength properties may be improved.

The impact copolymer may be prepared by using a general preparation reaction of a polymer so as to satisfy the above-described physical property conditions, or may be obtained commercially and used. Particular examples may include SEETE™ M1600 of LG Chem, Co., etc.

In addition, in the polypropylene-based composite according to an embodiment of the present invention, the polypropylene may particularly be one or more random propylene copolymers having a DSC melting temperature in a range of 120° C. to 160° C., and a melting flow rate (MFR) measured at 230° C. and a load of 2.16 kg according to ASTM-D 1238 in a range of 5 g/10 min to 120 g/10 min, and the random propylene copolymer may be included in 75 wt % to 97 wt %, more particularly, 85 wt % to 91 wt % with respect to the total weight of the polypropylene-based composite. If the polypropylene having such physical properties is included in the above-described amount range, the mechanical strength of the polypropylene composite including hardness, etc. may be improved. The random propylene copolymer may be prepared so as to satisfy the above-described physical property conditions by using the common preparation reaction of a polymer, or may be obtained commercially and used. Particular examples may include Braskem™ PP R7021-50RNA of Braskem America Inc., Formolene™ 7320A of *Formosa* Plastics Corporation in America, etc.

(B) Olefin-Based Polymer

The olefin-based polymer included in the polypropylene-based composite according to the present invention has a very low density and introduces a highly crystalline region when compared with a common conventional olefin-based polymer, and in case of having the same degrees of density and melt index (MI, 190° C., 2.16 kg load conditions), even higher tensile strength and tearing strength may be shown. The olefin-based polymer included in the polypropylene-based composite according to the present invention is prepared by a preparation method including a step of polymerizing an olefin-based monomer by injecting a hydrogen gas in the presence of a catalyst composition for polymerizing olefin, and according to the injection of the hydrogen gas during polymerization, a highly crystalline region is introduced, and excellent mechanical rigidity is shown.

The melt index (MI) may be controlled by controlling an amount of the comonomer used and that of a catalyst used in the process of polymerizing an olefin-based polymer and influences the mechanical properties and impact strength of the olefin-based polymer, and its moldability. In the present disclosure, the melt index is measured under low-density conditions of 0.860 g/cc to 0.880 g/cc according to ASTM D1238 at 190° C. and 2.16 kg load conditions, and may show 0.1 g/10 min to 10 g/10 min, particularly, 0.3 g/10 min to 9 g/10 min, more particularly, 0.4 g/10 min to 7 g/10 min.

Meanwhile, the density may be 0.850 g/cc to 0.890 g/cc, particularly, 0.850 g/cc to 0.880 g/cc, more particularly, 0.860 g/cc to 0.875 g/cc.

Generally, the density of an olefin-based polymer is influenced by the type and amount of a monomer used for polymerization, a polymerization degree, etc., and in case of a copolymer, the influence by the amount of a comonomer is significant. The olefin-based polymer of the present invention is polymerized using a catalyst composition including a transition metal compound having a characteristic structure, and a large amount of comonomer may be introduced. Accordingly, the olefin-based polymer of the present invention may have a low density as in the above-described range.

In addition, the olefin-based polymer may satisfy, when measured by a differential scanning calorimetry precise measurement method (SSA), T(90)-T(50)≤50 and T(95)-T(90)≥10, particularly, 20≤T(90)-T(50)≤45 and 10≤T(95)-T(90)≤30, more particularly, 30≤T(90)-T(50)≤40 and 10≤T(95)-T(90)≤20.

The T(50), T(90) and T(95) are temperatures at which 50%, 90%, and 95% of the olefin-based polymer are melted, respectively, when fractionating a temperature-heat capacity curve from measurement results by the differential scanning calorimetry precise measurement method (SSA).

Generally, the measurement of a melting temperature (Tm) using differential scanning calorimetry is performed by a first cycle including heating to a temperature higher by about 30° C. than the melting temperature (Tm) at a constant rate, and cooling to a temperature lower by about 30° C. than a glass transition temperature (Tg) at a constant rate and a second cycle to obtain the peak of a standard melting temperature (Tm). The differential scanning calorimetry precise measurement method (SSA) is a method of obtaining more accurate crystal information by undergoing a process of heating immediately before the peak of a melting temperature (Tm) and cooling after the first cycle using differential scanning calorimetry (DSC), and repeatedly performing heating to a temperature reduced by about 5° C. and cooling (Eur. Polym. J. 2015, 65, 132).

In case of introducing a small amount of a highly crystalline region to an olefin-based polymer, a high temperature melting peak may not be shown when measured by a melting temperature using general differential scanning calorimetry (DSC) but may be measured through the differential scanning calorimetry precise measurement method (SSA).

In addition, the olefin-based polymer according to an embodiment of the present invention may additionally satisfy the conditions of (4) a weight average molecular weight (Mw) of 10,000 g/mol to 500,000 g/mol, and particularly, the weight average molecular weight (Mw) may be 30,000 g/mol to 300,000 g/mol, more particularly, 50,000 g/mol to 200,000 g/mol. In the present invention, the weight average molecular weight (Mw) is a polystyrene conversion molecular weight analyzed by gel permeation chromatography (GPC).

In addition, the olefin-based polymer according to an embodiment of the present invention may additionally satisfy the conditions of (5) molecular weight distribution (MWD) which is the ratio (Mw/Mn) of a weight average molecular weight (Mw) and a number average molecular weight (Mn), of 0.1 to 6.0, and the molecular weight distribution (MWD) may particularly be 1.0 to 4.0, more particularly, 2.0 to 3.0.

In addition, the olefin-based polymer according to an embodiment of the present invention may satisfy the conditions of (6) a melting temperature (Tm) of 20° C. to 70° C. when measured by differential scanning calorimetry (DSC), wherein the melting temperature (Tm) may particularly be 25° C. to 60° C., more particularly, 25° C. to 50° C.

The olefin-based polymer may be any homopolymer selected from an olefin-based monomer, particularly, an alpha-olefin-based monomer, a cyclic olefin-based monomer, a diene olefin-based monomer, a triene olefin-based monomer and a styrene-based monomer, or a copolymer of two or more. More particularly, the olefin-based polymer may be a copolymer of ethylene with alpha-olefin of 3 to 12 carbon atoms, or a copolymer with alpha-olefin of 3 to 10 carbon atoms.

The alpha-olefin comonomer may include any one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eitocene, norbornene, norbonadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene and 3-chloromethylstyrene, or mixtures of two or more thereof.

More particularly, the olefin-based polymer according to an embodiment of the present invention may be a copolymer of ethylene with propylene, ethylene with 1-butene, ethylene with 1-hexene, ethylene with 4-methyl-1-pentene or ethylene with 1-octene, and more particularly, the olefin copolymer according to an embodiment of the present invention may be a copolymer of ethylene with 1-butene.

If the olefin-based polymer is the copolymer of ethylene and alpha-olefin, the amount of the alpha-olefin may be 90 wt % or less, more particularly, 70 wt % or less, further more particularly, 5 wt % to 60 wt %, further more particularly, 20 wt % to 50 wt % based on the total weight of the copolymer. If the alpha-olefin is included in the range, the achievement of the above-described physical properties may be easy.

The olefin-based polymer according to an embodiment of the present invention having the above-described physical properties and configurational characteristics may be prepared through continuous solution polymerization reaction for polymerizing an olefin-based monomer by injecting a hydrogen gas in the presence of a metallocene catalyst composition including one or more types of transition metal compounds in a single reactor. Accordingly, in the olefin-based polymer according to an embodiment of the present invention, a block composed by linearly connecting two or more repeating units derived from any one monomer among monomers constituting a polymer is not formed in the polymer. That is, the olefin-based polymer according to the present invention may not include a block copolymer, but may be selected from the group consisting of a random copolymer, an alternating copolymer and a graft copolymer, more particularly, a random copolymer.

In an embodiment of the present invention, the injection amount of the hydrogen gas may be 0.35 to 3 parts by weight, particularly, 0.4 to 2 parts by weight, more particularly, 0.45 to 1.5 parts by weight based on 1 part by weight of an olefin-based monomer injected into a reaction system. In addition, in an embodiment of the present invention, if the olefin-based polymer is polymerized by continuous solution polymerization, the hydrogen gas may be injected in an amount of 0.35 to 3 kg/h, particularly, 0.4 to 2 kg/h, more particularly, 0.45 to 1.5 kg/h based on 1 kg/h of the olefin-based monomer injected into a reaction system.

In addition, in another embodiment of the present invention, in case where the olefin-based polymer is a copolymer of ethylene and alpha-olefin, the hydrogen gas may be injected in an amount of 0.8 to 3 parts by weight, particularly, 0.9 to 2.8 parts by weight, more particularly, 1 to 2.7 parts by weight based on 1 part by weight of ethylene. In addition, in an embodiment of the present invention, in case where the olefin-based polymer is a copolymer of ethylene and alpha-olefin and is polymerized by continuous solution polymerization, the hydrogen gas may be injected into a reaction system in an amount of 0.8 to 3 kg/h, particularly, 0.9 to 2.8 kg/h, more particularly, 1 to 2.7 kg/h based on 1 kg/h of ethylene.

If polymerization is performed under conditions of injecting the above-described amount range of the hydrogen gas, the olefin-based polymer of the present invention may satisfy the above-described physical properties.

Particularly, the olefin-based copolymer of the present invention may be obtained by a preparation method including a step of polymerizing an olefin-based monomer by injecting a hydrogen gas in the presence of a catalyst composition for polymerizing olefin, including a transition metal compound of Formula 1 below.

However, in the preparation of an olefin-based polymer according to an embodiment of the present invention, it should be understood that the range of the structure of the transition metal compound of Formula 1 is not limited to a specific disclosed type, but all changes, equivalents or substituents included in the spirit and technical range of the present invention are included.

[Formula 1]

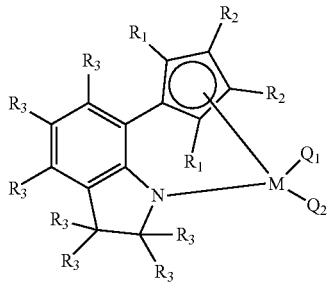

In Formula 1, $R_1$ groups are the same or different and each independently hydrogen, alkyl of 1 to 20 carbon atoms, alkenyl of 2 to 20 carbon atoms, aryl, silyl, alkylaryl, arylalkyl, or metalloid radical of a metal in group 4, which is substituted with hydrocarbyl, and two $R_1$ groups may be connected with each other by alkylidene radical containing alkyl of 1 to 20 carbon atoms or aryl radical of 6 to 20 carbon atoms to form a ring;

$R_2$ groups are the same or different and each independently hydrogen; halogen; alkyl of 1 to 20 carbon atoms; aryl; alkoxy; aryl oxy; or amido radical, and two $R_2$ groups may be connected with each other to form an aliphatic ring or an aromatic ring;

$R_3$ groups are the same or different and each independently hydrogen; halogen; alkyl of 1 to 20 carbon atoms; or a nitrogen-containing aliphatic or aromatic ring, which is unsubstituted or substituted with aryl radical, in case where multiple substituents are present, two or more substituents among the substituents may be connected with each other to form an aliphatic or aromatic ring;

M is a transition metal in group 4; and $Q_1$ and $Q_2$ are each independently halogen; alkyl of 1 to 20 carbon atoms; alkenyl; aryl; alkylaryl; arylalkyl; alkyl amido of 1 to 20 carbon atoms; aryl amido; or alkylidene radical of 1 to 20 carbon atoms.

In addition, in another embodiment of the present invention, in Formula 2, $R_1$ and $R_2$ may be the same or different and each independently hydrogen; alkyl of 1 to 20 carbon atoms; aryl; or silyl, $R_3$ groups may be the same or different and may be alkyl of 1 to 20 carbon atoms; alkenyl of 2 to 20 carbon atoms; aryl; alkylaryl; arylalkyl; alkoxy of 1 to 20 carbon atoms; aryloxy; or amido, and two or more $R_3$ groups may be connected with each other to form an aliphatic or aromatic ring;

$Q_1$ and $Q_2$ may be the same or different and each independently halogen; alkyl of 1 to 20 carbon atoms; alkyl amido of 1 to 20 carbon atoms; or aryl amido, and M may be a transition metal in group 4.

The transition metal compound represented by Formula 1 has characteristics in which a metal site is connected by a cyclopentadienyl (Cp) ligand introducing tetrahydroquinoline, and a narrow Cp-M-N angle and a wide $Q_1$-M-$Q_2$ ($Q_3$-M-$Q_4$) angle to which a monomer goes near, are maintained. In addition, according to the bonding of a ring type, Cp, tetrahydroquinoline, nitrogen and a metal site are connected in order, and more stable and rigid five-member ring structure is formed. Accordingly, in case of activating such compounds by reacting with a co-catalyst such as methylaluminoxane and $B(C_6F_5)_3$ and then, applying thereof to olefin polymerization, the polymerization of an olefin-based polymer having the characteristics of high activity, high molecular weight and high copolymerization properties may be achieved even at a high polymerization temperature.

Each substituent defined in the present disclosure will be explained in detail as follows.

The term "hydrocarbyl group" used in the present disclosure means a monovalent hydrocarbon group of 1 to 20 carbon atoms, which is composed of only carbon and hydrogen irrespective of its structure, such as alkyl, aryl, alkenyl, alkynyl, cycloalkyl, alkylaryl and arylalkyl, unless otherwise referred to.

The term "halogen" used in the present disclosure means fluorine, chlorine, bromine or iodine, unless otherwise referred to.

The term "alkyl" used in the present disclosure means a hydrocarbon residual group of a linear chain or branched chain, unless otherwise referred to.

The term "cycloalkyl" used in the present disclosure represents cyclic alkyl including cyclopropyl, etc., unless otherwise referred to.

The term "alkenyl" used in the present disclosure means an alkenyl group of a linear chain or branched chain, unless otherwise referred to.

The branched chain may be alkyl of 1 to 20 carbon atoms; alkenyl of 2 to 20 carbon atoms; aryl of 6 to 20 carbon atoms; alkylaryl of 7 to 20 carbon atoms; or arylalkyl of 7 to 20 carbon atoms.

The term "aryl" used in the present invention represents, unless otherwise referred to, an aromatic group of 6 to 20 carbon atoms, particularly, phenyl, naphthyl, anthryl, phenanthryl, chrysenyl, pyrenyl, anthracenyl, pyridyl, dimethylanilinyl, anisolyl, etc., without limitation.

The alkylaryl group means an aryl group substituted with the alkyl group.

The arylalkyl group means an alkyl group substituted with the aryl group.

The cyclic group (or heterocyclic group) means a monovalent aliphatic or aromatic hydrocarbon group having 5 to 20 ring-forming carbon atoms and including one or more heteroatoms, and may be a single ring or a condensed ring of two or more rings. In addition, the heterocyclic group may be unsubstituted or substituted with an alkyl group. Examples thereof may include indoline, tetrahydroquinoline, etc., but the present invention is not limited thereto.

The alkyl amino group means an amino group substituted with the alkyl group, and includes a dimethylamino group, a diethylamino group, etc., without limitation.

According to an embodiment of the present invention, the aryl group may preferably have 6 to 20 carbon atoms, and may particularly be phenyl, naphthyl, anthracenyl, pyridyl, dimethylanilinyl, anisolyl, etc., without limitation.

In the present disclosure, the silyl may be silyl unsubstituted or substituted with alkyl of 1 to 20 carbo atoms, for example, silyl, trimethylsilyl, triethylsilyl, tripropylsilyl, tributylsilyl, trihexylsilyl, triisopropylsilyl, triisobutylsilyl, triethoxysilyl, triphenylsilyl, tris(trimethylsilyl)silyl, etc., without limitation.

The compound of Formula 1 may be Formula 1-1 below, without limitation.

[Formula 1-1]

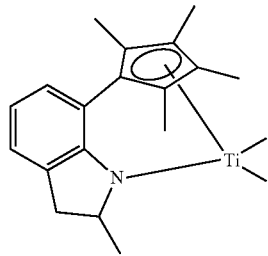

Besides, the compound may have various structures within the range defined in Formula 1.

The transition metal compound of Formula 1 may introduce a large amount of alpha-olefin as well as low-density polyethylene due to the structural characteristics of a catalyst, and a low-density polyolefin copolymer with a degree of 0.850 g/cc to 0.890 g/cc may be prepared.

The transition metal compound of Formula 1 may be prepared by, for example, a method below.

[Reaction 1]

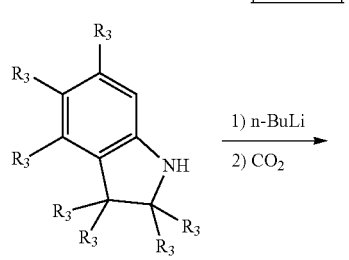

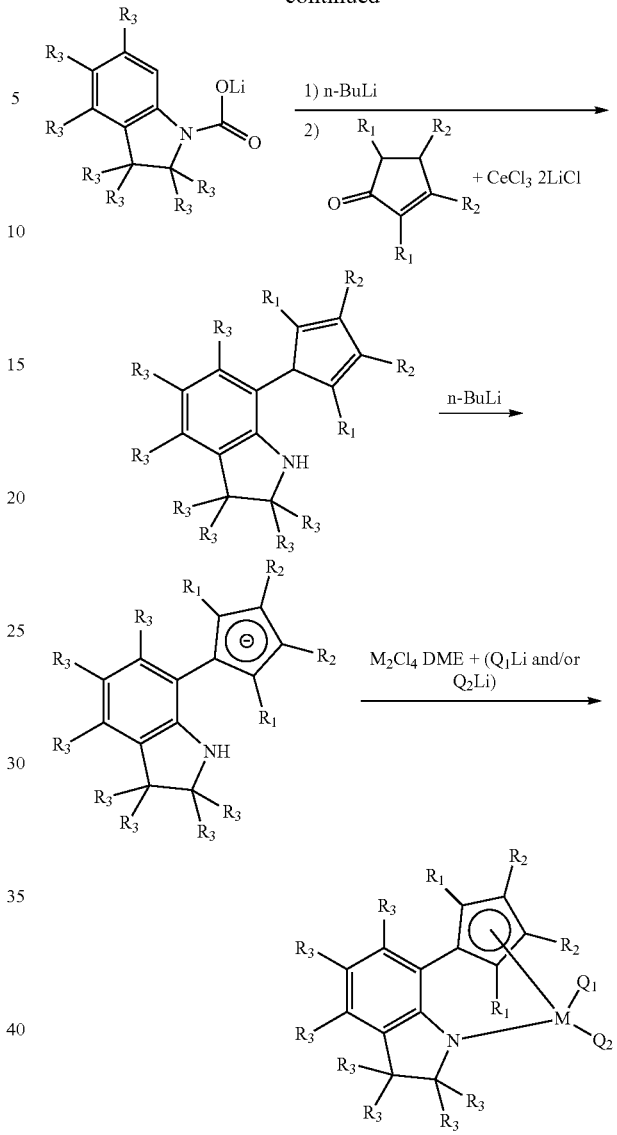

In Reaction 1, $R_1$ to $R_3$, M, $Q_1$ and $Q_2$ are the same as defined in Formula 1.

Formula 1 may be prepared by a method disclosed in Patent Laid-open No. 2007-0003071, and all contents of the patent document are included in the present disclosure.

The transition metal compound of Formula 1 may be used as a catalyst of polymerization reaction as a composition type additionally including one or more among the cocatalyst compounds represented by Formula 2, Formula 3, and Formula 4 below.

$$—[Al(R_4)—O]_a—$$ [Formula 2]

$$A(R_4)_3$$ [Formula 3]

$$[L-H]^+[W(D)_4]^- \text{ or } [L]^+[W(D)_4]^-$$ [Formula 4]

In Formulae 2 to 4, $R_4$ groups may be the same or different from each other and each independently selected from the group consisting of halogen, hydrocarbyl of 1 to 20 carbon atoms, and halogen-substituted hydrocarbyl of 1 to 20 carbon atoms, A is aluminum or boron, D groups are each independently aryl of 6 to 20 carbon atoms or alkyl of 1 to 20 carbon atoms, of which one or more hydrogen atoms may be substituted with substituents, wherein the substituent is at least any one selected from the group consisting of halogen, hydrocarbyl of 1 to 20 carbon atoms, alkoxy of 1 to 20 carbon atoms and aryloxy of 6 to 20 carbon atoms, H is a hydrogen atom, L is a neutral or cationic Lewis acid, W is an element in group 13, and a is an integer of 2 or more.

Examples of the compound represented by Formula 2 may include alkylaluminoxane such as methylaluminoxane (MAO), ethylaluminoxane, isobutylaluminoxane and butylalminoxane, and a modified alkylaluminoxane obtained by mixing two or more types of the alkylaluminoxane, particularly, methylaluminoxane, modified methylaluminoxane (MAO).

Examples of the compound represented by Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc. and particularly, may be selected from trimethylaluminum, triethylaluminum and triisobutylaluminum.

Examples of the compound represented by Formula 4 may include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliumtetraphenylboron, N,N-diethylaniliumtetrapentafluorophenylboron, diethylammoniumtetrapentafluorophenylboron, triphenylphosphoniumtetraphenylboron, trimethylphosphoniumtetraphenylboron, dimethylanilium tetrakis(pentafluorophenyl) borate, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliumtetrapentafluorophenylaluminum, diethylammoniumtetrapentafluorotetraphenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl)boron, triphenylcarboniumtetra(p-trifluoromethylphenyl)boron, or triphenylcarboniumtetrapentafluorophenylboron.

The catalyst composition may be prepared by, as a first method, a preparation method including a step of obtaining a mixture by contacting the transition metal compound represented by Formula 1 with the compound represented by Formula 2 or Formula 3; and a step of adding the compound represented by Formula 4 to the mixture.

In addition, the catalyst composition may be prepared by, as a second method, a method of making contacting of the transition metal compound represented by Formula 1 with the compound represented by Formula 4.

In the first method in the preparation method of the catalyst composition, the molar ratio of the transition metal compound represented by Formula 1/the compound represented by Formula 2 or Formula 3 may be $1/5{,}000$ to $1/2$, particularly, $1/1{,}000$ to $1/10$, more particularly, $1/500$ to $1/20$. If the molar ratio of the transition metal compound represented by Formula 1/the compound represented by Formula 2 or Formula 3 is greater than $1/2$, the amount of an alkylating agent is too small, and the alkylation of a metal compound may be incompletely carried out, and if the molar ratio is less than $1/5{,}000$, the alkylation of the metal compound may be achieved, but the activation of the alkylated metal compound may be incompletely carried out due to the side reactions between an excessive amount of the alkylating agent remained and an activating agent which is the compound of Formula 4. In addition, the molar ratio of the transition metal compound represented by Formula 1/the compound represented by Formula may be $1/25$ to 1, particularly, $1/10$ to 1, more particularly, $1/5$ to 1. If the molar ratio of the transition metal compound represented by Formula 1/the compound represented by Formula 4 is greater than 1, the amount of an activating agent is relatively small, and the activation of the metal compound may be incompletely carried out, and thus, the activity of the catalyst composition may be deteriorated. If the molar ratio is less than $1/25$, the activation of the metal compound may be completely carried out, but due to the excessive amount of the activating agent remained, it would not be economical considering the unit cost of the catalyst composition, or the purity of a polymer produced may be degraded.

In the second method in the preparation method of the catalyst composition, the molar ratio of the transition metal compound represented by Formula 1/the compound represented by Formula 4 may be $1/10{,}000$ to $1/10$, particularly, $1/5{,}000$ to $1/100$, more particularly, $1/3{,}000$ to $1/500$. If the molar ratio is greater than $1/10$, the amount of an activating agent is relatively small, and the activation of the metal compound may be incompletely carried out, and the activity of the catalyst composition thus produced may be degraded. If the molar ratio is less than $1/10{,}000$, the activation of the metal compound may be completely carried out, but due to the excessive amount of the activating agent remained, it would not be economical considering the unit cost of the catalyst composition, or the purity of a polymer produced may be degraded.

As the reaction solvent during preparing the catalyst composition, a hydrocarbon-based solvent such as pentane, hexane, and heptane, or an aromatic solvent such as benzene and toluene may be used.

In addition, the catalyst composition may include the transition metal compound and the co-catalyst compound in a supported type on a support.

Any supports used in a metallocene-based catalyst may be used as the support without specific limitation. Particularly, the support may be silica, silica-alumina or silica-magnesia, and any one among them or mixtures of two or more thereof may be used.

In case where the support is silica among them, since a silica support and the functional group of the metallocene compound of Formula 1 may form a chemical bond, there is no catalyst separated from the surface during an olefin polymerization process. As a result, the generation of fouling, by which polymer particles are agglomerated on the wall side of a reactor or from each other during the preparation process of an olefin-based copolymer, may be prevented. In addition, the particle shape and apparent density of a polymer of the olefin-based copolymer prepared in the presence of a catalyst including the silica support are excellent.

More particularly, the support may be silica or silica-alumina, including a highly reactive siloxane group and dried at a high temperature through a method of drying at a high temperature, etc.

The support may further include an oxide, a carbonate, a sulfate, or a nitrate component such as $Na_2O$, $K_2CO_3$, $BaSO_4$ and $Mg(NO_3)_2$.

The polymerization reaction for polymerizing the olefin-based monomer may be achieved by a common process applied to the polymerization of an olefin monomer such as continuous solution polymerization, bulk polymerization, suspension polymerization, slurry polymerization and emulsion polymerization.

The polymerization reaction of the olefin monomer may be performed in an inert solvent, and as the inert solvent, benzene, toluene, xylene, cumene, heptane, cyclohexane, methylcyclohexane, methylcyclopentane, n-hexane, 1-hexene, and 1-octene may be used, without limitation.

The polymerization of the olefin-based polymer may be performed at a temperature of about 25° C. to about 500° C., particularly, at a temperature of 80° C. to 250° C., more preferably, 100° C. to 200° C. In addition, the reaction pressure during the polymerization may be 1 kgf/cm² to 150 kgf/cm², preferably, 1 kgf/cm² to 120 kgf/cm², more preferably, 5 kgf/cm² to 100 kgf/cm².

MODE FOR CARRYING OUT THE INVENTION

Examples

Hereinafter, embodiments of the present invention will be explained in detail so that a person skilled in the art where the present invention belongs could easily perform. However, the present invention may be accomplished in various different types and is not limited to the embodiments explained herein.

Catalyst Preparation Example 1: Preparation of Transition Metal Compound A

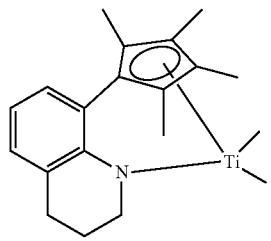

(1) Preparation of 8-(2,3,4,5-tetramethyl-1,3-cyclopentadienyl)-1,2,3,4-tetrahydroquinoline (i) Preparation of Lithium Carbamate 1,2,3,4-tetrahydroquinoline (13.08 g, 98.24 mmol) and diethyl ether (150 mL) were put in a shlenk flask. Into a low-temperature bath of −78° C. obtained by dry ice and acetone, the shlenk flask was immersed and stirred for 30 minutes. Then, n-BuLi (39.9 mL, 2.5 M, 98.24 mmol) was injected under a nitrogen atmosphere via a syringe, and a light yellow slurry was formed. Then, the flask was stirred for 2 hours, and the temperature of the flask was elevated to room temperature while removing a butane gas produced. The flask was immersed again into the low-temperature bath of −78° C. to reduce the temperature, and a $CO_2$ gas was injected. According to the injection of the carbon dioxide gas, the slurry disappeared into a transparent solution. The flask was connected with a bubbler, and the temperature was elevated to room temperature while removing the carbon dioxide gas. After that, remaining $CO_2$ gas and solvents were removed under vacuum. After transporting the flask to a dry box, pentane was added thereto, followed by vigorous stirring and filtering to obtain lithium carbamate as a white solid compound. In the white solid compound, diethyl ether made a coordination bond. In this case, the yield was 100%.

$^1$H NMR ($C_5D_5N$, $C_5D_5N$): δ 1.90 (t, J=7.2 Hz, 6H, ether), 1.50 (br s, 2H, quin-$CH_2$), 2.34 (br s, 2H, quin-$CH_2$). 3.25 (q, J=7.2 Hz, 4H, ether), 3.87 (br, s, 2H, quin-$CH_2$). 6.76 (br d, J=5.6 Hz, 1H, quin-CH) ppm $^{13}$C NMR ($C_6D_6$): δ 24.24, 28.54, 45.37, 65.95, 121.17, 125.34, 125.57, 142.04, 163.09 (C=O) ppm (ii) Preparation of 8-(2,3,4,5-tetramethyl-1,3-cyclopentadienyl)-1,2,3,4-tetrahydroquinoline

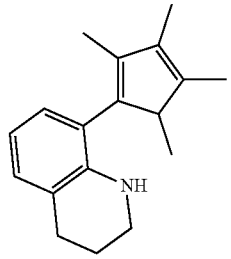 [SMILES: CC1=C(C)C(C)C(c2cccc3c2NCCC3)=C1C]

The lithium carbamate compound (8.47 g, 42.60 mmol) prepared in step (i) above was put in a shlenk flask. Then, tetrahydrofuran (4.6 g, 63.9 mmol) and 45 mL of diethyl ether were added thereto in order. Into a low-temperature bath of −20° C. obtained by acetone and a small amount of dry ice, the shlenk flask was immersed and stirred for 30 minutes, and n-BuLi (25.1 mL, 1.7 M, 42.60 mmol) was injected. In this case, the color of the reaction mixture was changed into red. While continuously maintaining −20° C., stirring was performed for 6 hours. A $CeCl_3 \cdot 2LiCl$ solution (129 mL, 0.33 M, 42.60 mmol) dissolved in tetrahydrofuran and tetramethylcyclopentanone (5.89 g, 42.60 mmol) were mixed in a syringe and then injected into the flask under a nitrogen atmosphere. In the middle of slowly elevating the temperature of the flask to room temperature, a thermostat was removed after 1 hour, and the temperature was maintained to room temperature. Then, water (15 mL) was added to the flask, and ethyl acetate was put, followed filtering to obtain a filtrate. The filtrate was transported to a separating funnel, and hydrochloric acid (2 N, 80 mL) was added thereto, followed by shaking for 12 minutes. Then, a saturated sodium bicarbonate solution (160 mL) was added to neutralize, and an organic layer was extracted. To the organic layer, anhydrous magnesium sulfate was put to remove moisture, and filtering was conducted. The filtrate was taken, and solvents were removed. The filtrate thus obtained was separated by a column chromatography method using a solvent of hexane and ethyl acetate (v/v, 10:1) to obtain a yellow oil. The yield was 40%.

$^1$H NMR (C$_6$D$_6$): δ 1.00 (br d, 3H, Cp-CH$_3$), 1.63-1.73 (m, 2H, quin-CH$_2$), 1.80 (s, 3H, Cp-CH$_3$), 1.81 (s, 3H, Cp-CH$_3$). 1.85 (s, 3H, Cp-CH$_3$), 2.64 (t, J=6.0 Hz, 2H, quin-CH$_2$). 2.84-2.90 (br, 2H, quin-CH$_2$), 3.06 (br s, 1H, Cp-H), 3.76 (br s, 1H, N—H), 6.77 (t, J=7.2 Hz, 1H, quin-CH), 6.92 (d, J=2.4 Hz, 1H, quin-CH), 6.94 (d, J=2.4 Hz, 1H, quin-CH) ppm (2) Preparation of [(1,2,3,4-tetrahydroquinolin-8-yl)tetramethylcyclopentadienyl-η$^5$,κ-N]titanium dimethyl

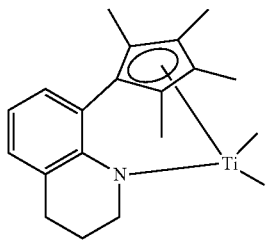

(i) Preparation of [(1,2,3,4-tetrahydroquinoline-8-yl)tetramethylcyclopentadienyl-η$^5$,κ-N]dilithium compound In a dry box, 8-(2,3,4,5-tetramethyl-1,3-cyclopentadienyl)-1,2,3,4-tetrahydroquinoline (8.07 g, 32.0 mmol) prepared through step (1) above, and 140 mL of diethyl ether were put in a round flask, the temperature was reduced to −30° C., and n-BuLi (17.7 g, 2.5 M, 64.0 mmol) was slowly added while stirring. The reaction was performed for 6 hours while elevating the temperature to room temperature. After that, washing with diethyl ether was conducted several times, and filtering was conducted to obtain a solid. Remaining solvents were removed by applying vacuum to obtain a dilithium compound (9.83 g) as a yellow solid. The yield was 95%.

$^1$H NMR (C$_6$D$_6$, C$_5$D$_5$N): δ 2.38 (br s, 2H, quin-CH$_2$), 2.53 (br s, 12H, Cp-CH$_3$), 3.48 (br s, 2H, quin-CH$_2$), 4.19 (br s, 2H, quin-CH$_2$), 6.77 (t, J=6.8 Hz, 2H, quin-CH), 7.28 (br s, 1H, quin-CH), 7.75 (brs, 1H, quin-CH) ppm (ii) Preparation of (1,2,3,4-tetrahydroquinolin-8-yl)tetramethylcyclopentadienyl-η$^5$,κ-N]titanium dimethyl In a dry box, TiCl$_4$·DME (4.41 g, 15.76 mmol) and diethyl ether (150 mL) were put in a round flask, and while stirring at −30° C., MeLi (21.7 mL, 31.52 mmol, 1.4 M) was slowly added. After stirring for 15 minutes, the (1,2,3,4-tetrahydroquinolin-8-yl)tetramethylcyclopentadienyl-ηη$^5$,κ-N]dilithium compound (5.30 g, 15.78 mmol) prepared in step (i) above was put in the flask. While elevating the temperature to room temperature, stirring was conducted for 3 hours. After finishing the reaction, vacuum was applied to remove solvents, and the resultant residue was dissolved in pentane and filtered, and the filtrate was taken. By removing pentane by applying vacuum, a dark brown compound (3.70 g) was obtained. The yield was 71.3%.

$^1$H NMR (C$_6$D$_6$): δ 0.59 (s, 6H, Ti—CH$_3$), 1.66 (s, 6H, Cp-CH$_3$), 1.69 (br t, J=6.4 Hz, 2H, quin-CH$_2$), 2.05 (s, 6H, Cp-CH$_3$), 2.47 (t, J=6.0 Hz, 2H, quin-CH$_2$), 4.53 (m, 2H, quin-CH$_2$), 6.84 (t, J=7.2 Hz, 1H, quin-CH), 6.93 (d, J=7.6 Hz, quin-CH$_2$), 7.01 (d, J=6.8 Hz, quin-CH) ppm $^{13}$C NMR (C$_6$D$_6$): δ 12.12, 23.08, 27.30, 48.84, 51.01, 119.70, 119.96, 120.95, 126.99, 128.73, 131.67, 136.21 ppm Catalyst Preparation Example 2: Preparation of Transition Metal Compound B

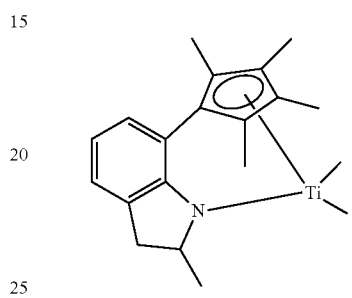

(1) Preparation of 2-methyl-7-(2,3,4,5-tetramethyl-1,3-cyclopentadienyl)indoline 2-methyl-7-(2,3,4,5-tetramethyl-1,3-cyclopentadienyl)indoline was prepared through the same method as in (1) in Preparation Example 1 except for using 2-methylindoline instead of 1,2,3,4-tetrahydroquinoline in (1) of Preparation Example 1. The yield was 19%.

$^1$H NMR (C$_6$D$_6$): δ 6.97 (d, J=7.2 Hz, 1H, CH), δ 6.78 (d, J=8 Hz, 1H, CH), δ 6.67 (t, J=7.4 Hz, 1H, CH), δ 3.94 (m, 1H, quinoline-CH), δ 3.51 (br s, 1H, NH), δ 3.24-3.08 (m, 2H, quinoline-CH$_2$, Cp-CH), δ 2.65 (m, 1H, quinoline-CH$^2$), δ 1.89 (s, 3H, Cp-CH$_3$), δ 1.84 (s, 3H, Cp-CH$_3$), δ 1.82 (s, 3H, Cp-CH$_3$). δ 1.13 (d, J=6 Hz, 3H, quinoline-CH$_3$), δ 0.93 (3H, Cp-CH$_3$) ppm.

(2) Preparation of [(2-Methylindolin-7-yl)tetramethylcyclopentadienyl-eta5,kapa-N]titanium dimethyl (i) A dilithium salt compound (compound 4 g) coordinated with 0.58 equivalent of diethyl ether was obtained (1.37 g, 50%) through the same method as in (2)(i) in Preparation Example 1 except for using 2-methyl-7-(2,3,4,5-tetramethyl-1,3-cyclopentadienyl)-indoline (2.25 g, 8.88 mmol) instead of 8-(2,3,4,5-tetramethyl-1,3-cyclopentadienyl)-1,2,3,4-tetrahydroquinoline.

$^1$H NMR (Pyridine-d8): δ 7.22 (br s, 1H, CH), δ 7.18 (d, J=6 Hz, 1H, CH), δ 6.32 (t, 1H, CH), δ 4.61 (brs, 1H, CH), δ 3.54 (m, 1H, CH), δ 3.00 (m, 1H, CH), δ 2.35-2.12 (m, 13H, CH, Cp-CH$_3$), δ 1.39 (d, indoline-CH$_3$) ppm.

(ii) A titanium compound was prepared through the same method as in (2) (ii) in Preparation Example 1 using the dilithium salt compound (compound 4 g) (1.37 g, 4.44 mmol) prepared in (i) above.

$^1$H NMR (C$_6$D$_6$): δ 7.01-6.96 (m, 2H, CH), δ 6.82 (t, J=7.4 Hz, 1H, CH), δ 4.96 (m, 1H, CH), δ 2.88 (m, 1H, CH), δ 2.40 (m, 1H, CH), δ 2.02 (s, 3H, Cp-CH$_3$), δ 2.01 (s, 3H, Cp-CH$_3$), 1.70 (s, 3H, Cp-CH$_3$), δ 1.69 (s, 3H, Cp-CH$_3$), δ 1.65 (d, J=6.4 Hz, 3H, indoline-CH$_3$), δ 0.71 (d, J=10 Hz, 6H, TiMe$_2$-CH$_3$) ppm.

Preparation Example 1

To a 1.5 L continuous process reactor, a hexane solvent (5 kg/h) and 1-butene (0.95 kg/h) were charged, and the temperature of the top of the reactor was pre-heated to 140.7° C. A triisobutylaluminum compound (0.06 mmol/min), the transition metal compound B (0.40 µmol/min) obtained in Preparation Example 2, and a dimethylanilinium tetrakis(pentafluorophenyl) borate co-catalyst (1.20 µmol/min) were injected at the same time into the reactor. Then, a hydrogen gas (15 cc/min) and ethylene (0.87 kg/h) were injected into the reactor, and copolymerization reaction was performed by maintaining 141° C. for 30 minutes or more in a continuous process with a pressure of 89 bar to obtain a copolymer. After drying in a vacuum oven for 12 hours or more, physical properties were measured.

Preparation Examples 2 to 5

Copolymers were obtained by performing the same copolymerization reaction as in Preparation Example 1 except for changing the amount used of a transition metal compound, the amounts used of a catalyst and a co-catalyst, the reaction temperature, the injection amount of hydrogen and the amount of a comonomer as in Table 1 below.

Comparative Preparation Example 1

DF610 of Mitsui Chemicals Inc. was purchased and used.

Comparative Preparation Examples 2 to 4

Copolymers were obtained by performing the same copolymerization reaction as in Preparation Example 1 except for changing the type of a transition metal compound, the amount used of a transition metal compound, the amounts used of a catalyst and a co-catalyst, the reaction temperature, the injection amount of hydrogen and the amount of a comonomer as in Table 1 below.

Comparative Preparation Example 5

DF710 of Mitsui Chemicals Inc. was purchased and used.

Comparative Preparation Example 6

DF640 of Mitsui Chemicals Inc. was purchased and used.

Comparative Preparation Example 7

EG7447 of Dow Co. was purchased and used.

TABLE 1

| | Catalyst type | Catalyst amount used (µmol/min) | Co-cat. (µmol/min) | TiBAl (mmol/min) | Ethylene (kg/h) | Hexane (Kg/h) | 1-butene (kg/h) | Hydrogen (cc/min) | Reaction temp. (° C.) |
|---|---|---|---|---|---|---|---|---|---|
| Preparation Example 1 | Transition metal compound B | 0.40 | 1.20 | 0.06 | 0.87 | 5 | 0.95 | 15 | 141 |
| Preparation Example 2 | Transition metal compound B | 0.60 | 1.80 | 0.05 | 0.87 | 7 | 0.93 | 32 | 145 |
| Preparation Example 3 | Transition metal compound B | 0.45 | 1.35 | 0.04 | 0.87 | 7 | 0.75 | 15 | 145 |
| Preparation Example 4 | Transition metal compound B | 0.74 | 2.22 | 0.05 | 0.87 | 7 | 0.93 | 25 | 150 |
| Preparation Example 5 | Transition metal compound B | 0.55 | 1.65 | 0.04 | 0.87 | 7 | 0.84 | 38 | 148 |
| Comparative Preparation Example 2 | Transition metal compound B | 0.78 | 2.34 | 0.06 | 0.87 | 5 | 1.15 | — | 161 |
| Comparative Preparation Example 3 | Transition metal compound A | 0.32 | 0.96 | 0.05 | 0.87 | 5 | 0.62 | — | 145 |
| Comparative Preparation Example 4 | Transition metal compound B | 0.50 | 1.50 | 0.06 | 0.87 | 5 | 1.15 | 10 | 161 |

Experimental Example 1: Evaluation of Physical Properties of Olefin-Based Polymer With respect to the copolymers of Preparation Examples 1 to 5, and Comparative Preparation Examples 1 to 4, physical properties were evaluated according to the methods below and are shown in Tables 2 and 3 below.

1) Density of Polymer

Measurement was conducted according to ASTM D-792.

2) Melt Index (MI) of Polymer

Measurement was conducted according to ASTM D-1238 (condition E, 190° C., 2.16 kg load).

3) Weight Average Molecular Weight (Mw, g/Mol) and Molecular Weight Distribution (MWD)

A number average molecular weight (Mn) and a weight average molecular weight (Mw) were measured respectively, using gel permeation chromatography (GPC), and molecular weight distribution was calculated through dividing the weight average molecular weight by the number average molecular weight.

Column: PL Olexis
Solvent: trichlorobenzene (TCB)
Flow rate: 1.0 ml/min

Specimen concentration: 1.0 mg/ml
Injection amount: 200 µl
Column temperature: 160° C.
Detector: Agilent High Temperature RI detector
Standard: Polystyrene (calibrated by cubic function)
4) Melting Temperature (Tm) of Polymer The melting temperature was obtained using a differential scanning calorimeter (DSC: differential scanning calorimeter 250) manufactured by TA instrument Co. That is, the temperature was elevated to 150° C., kept for 1 minute, and reduced to −100° C., and then, the temperature was elevated again. The apex of a DSC curve was set to the melting point. In this case, the elevating rate and reducing rate of the temperature were controlled to 10° C./min, and the melting temperature was obtained during the second elevation of the temperature.

Figure 2:
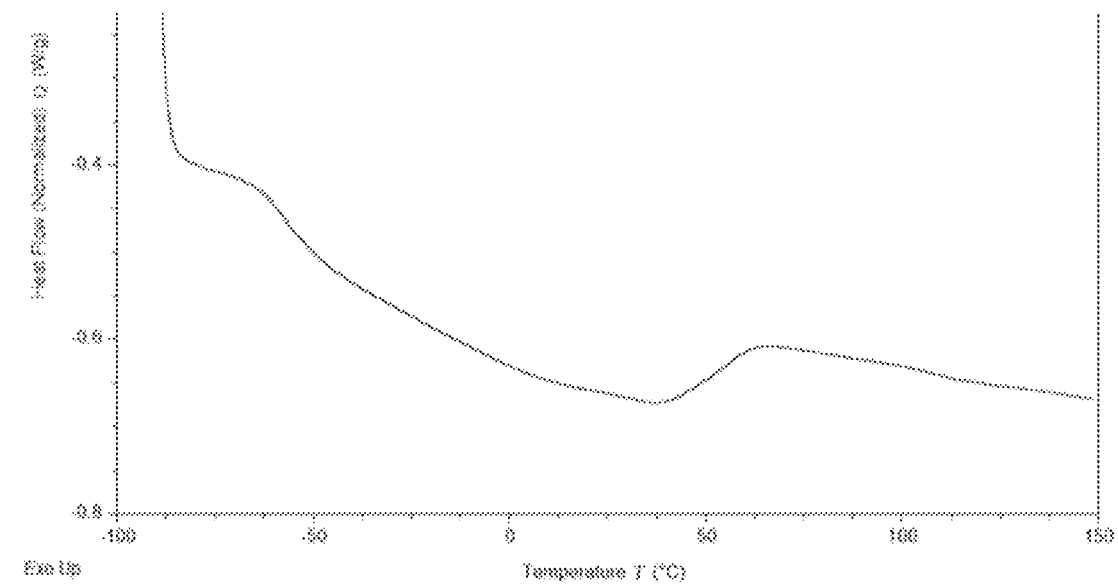
FIG. 2 is a graph showing measured results of a melting temperature using differential scanning calorimetry (DSC) on a polymer of Comparative Preparation Example 1.

The DSC graph of the polymer of Preparation Example 1 is shown in FIG. 1, and the DSC graph of the polymer of Comparative Preparation Example 1 is shown in FIG. 2.

5) High Temperature Melting Peak of Polymer and T(95), T(90), and T(50)

Measurement was conducted by using a differential scanning calorimeter (DSC: differential scanning calorimeter 250) manufactured by TA instrument Co. and by a successive self-nucleation/annealing (SSA) measurement method.

Particularly, in the first cycle, the temperature was elevated to 150° C., kept for 1 minute, and reduced to −100° C. In the second cycle, the temperature was elevated to 120° C., kept for 30 minutes, and reduced to −100° C. In the third cycle, the temperature was elevated to 110° C., kept for 30 minutes, and reduced to −100° C. As described above, a process of elevating the temperature and decreasing to −100° C. by an interval of 10° C. was repeated to −60° C. so as to crystallize in each temperature section.

In the last cycle, the temperature was elevated to 150° C., and heat capacity was measured.

The temperature-heat capacity curve thus obtained was integrated by each section, and the heat capacity of each section with respect to total heat capacity was fractionated. Here, the temperature at which 50% of the total is melted is defined as T(50), 90% of the total is melted is defined as T(90), and 95% of the total is melted is defined as T(95).

Figure 3:
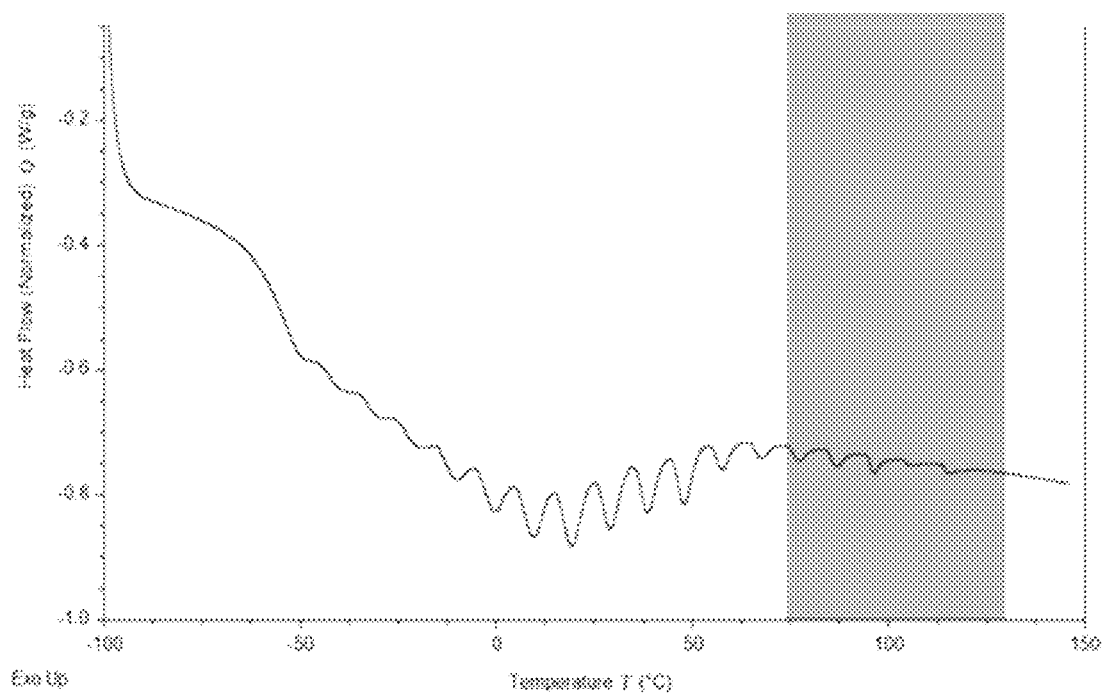
FIG. 3 is a graph showing measured results by a differential scanning calorimetry precise measurement method (SSA) on a polymer of Preparation Example 1.
Figure 4:
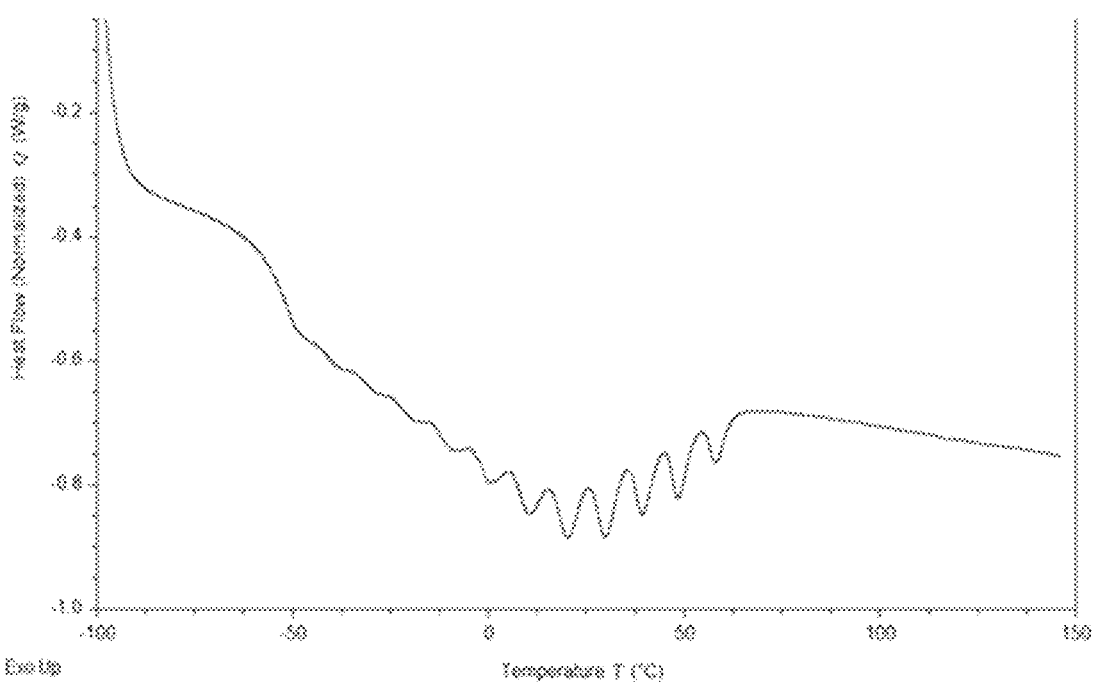
FIG. 4 is a graph showing measured results by a differential scanning calorimetry precise measurement method (SSA) on a polymer of Comparative Preparation Example 1.

FIG. 3 shows an SSA graph of the polymer of Preparation Example 1, and FIG. 4 shows an SSA graph of the polymer of Comparative Preparation Example 1.

Figure 5:
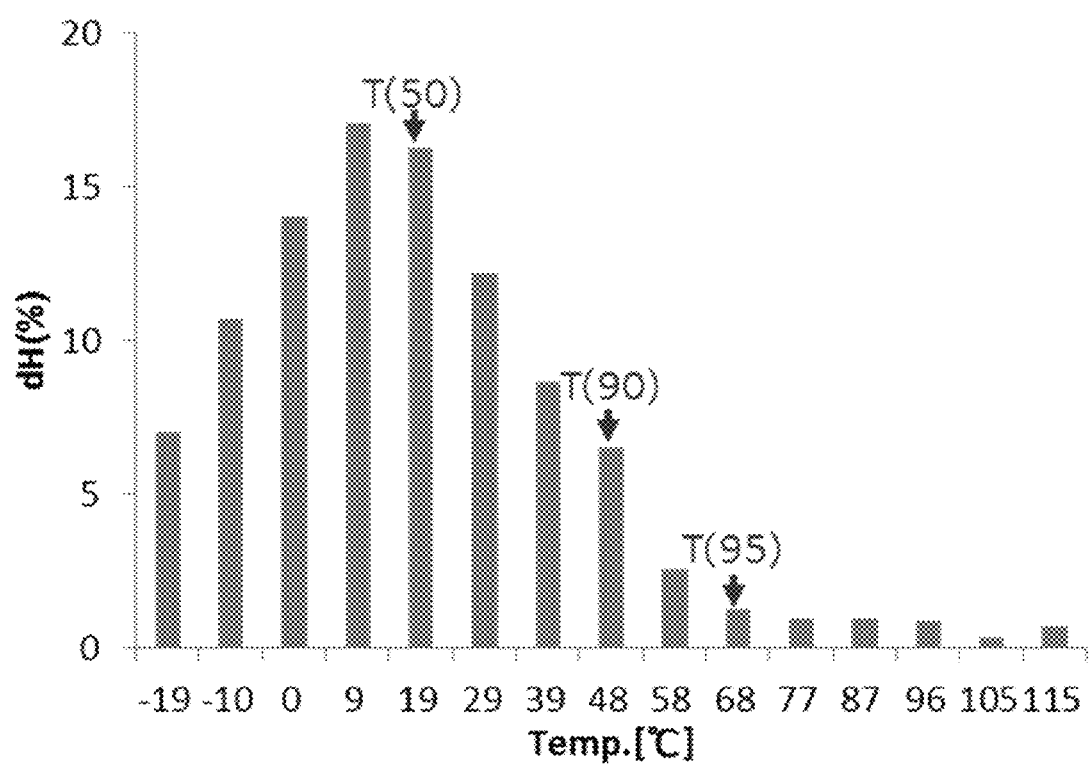
FIG. 5 is a graph showing $T(50)$, $T(90)$, and $T(95)$ after fractionating measured results by a differential scanning calorimetry precise measurement method (SSA) on a polymer of Preparation Example 1.
Figure 6:
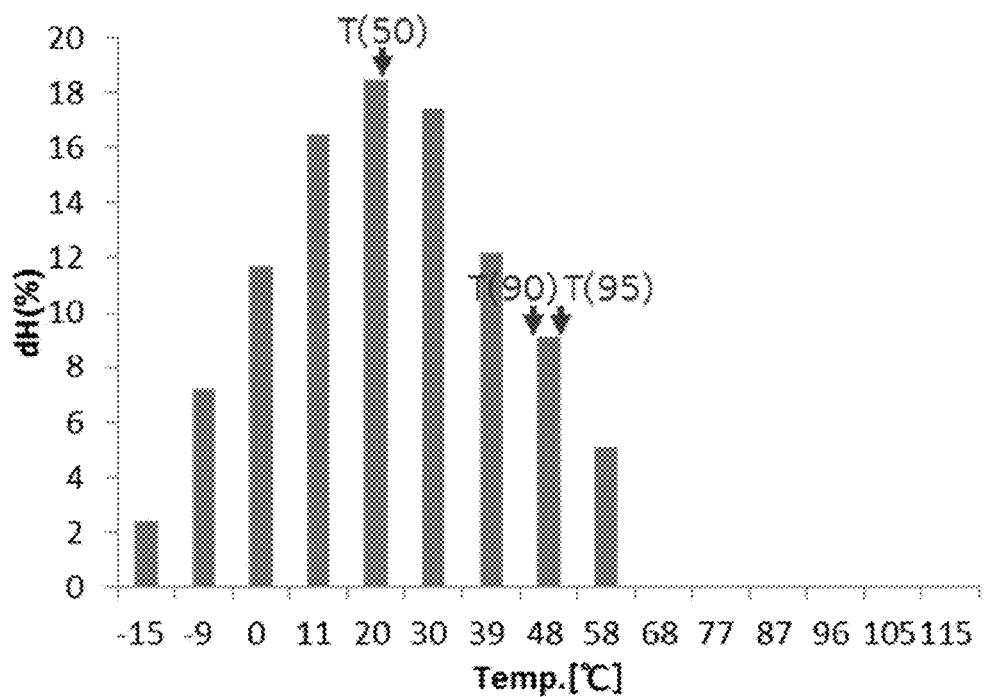
FIG. 6 is a graph showing $T(50)$, $T(90)$, and $T(95)$ after fractionating measured results by a differential scanning calorimetry precise measurement method (SSA) on a polymer of Comparative Preparation Example 1.

FIG. 5 shows a fractionated graph of the SSA results of the polymer of Preparation Example 1, and FIG. 6 shows a fractionated graph of the SSA results of the polymer of Comparative Preparation Example 1.

6) Hardness (Shore A)

Hardness was measured according to the standard of ASTM D2240 using GC610 STAND for durometer of TECLOCK Co. and a shore durometer Type A of Mitutoyo Co.

7) Tensile Strength and Tearing Strength of Polymer

The olefin-based copolymers of Preparation Example 1 and Comparative Preparation Examples 1 to 3 were extruded to manufacture pallet shapes, and tensile strength and tearing strength when broken were measured according to ASTM D638 (50 mm/min).

TABLE 2

| | Density (g/mL) | MI (g/10 min) | Mw (g/mol) | MWD | DSC Tm (° C.) | SSA T(50) | T(90) | T(95) | T(90)−T(50) | T(95)−T(90) |
|---|---|---|---|---|---|---|---|---|---|---|
| Preparation Example 1 | 0.862 | 1.20 | 106,000 | 2.01 | 32.1 | 16.0 | 51.1 | 67.6 | 35.1 | 16.5 |
| Preparation Example 2 | 0.866 | 4.39 | 69,070 | 2.07 | 33.0 | 19.8 | 57.4 | 83.8 | 37.6 | 26.4 |
| Preparation Example 3 | 0.872 | 1.22 | 99,068 | 2.05 | 45.9 | 31.1 | 61.9 | 73.0 | 30.8 | 11.1 |
| Preparation Example 4 | 0.866 | 3.30 | 70,000 | 2.11 | 37.8 | 22.9 | 54.6 | 64.9 | 31.7 | 10.3 |
| Preparation Example 5 | 0.865 | 5.10 | 75,388 | 2.09 | 37.2 | 23.1 | 54.1 | 65.3 | 31.0 | 11.2 |
| Comparative Preparation Example 1 | 0.861 | 1.32 | 105,000 | 1.98 | 39.7 | 20.1 | 48.4 | 54.6 | 28.3 | 6.2 |
| Comparative Preparation Example 2 | 0.861 | 1.12 | 102,000 | 2.11 | 28.6 | 14.7 | 46.0 | 54.9 | 31.3 | 8.9 |
| Comparative Preparation Example 3 | 0.862 | 1.20 | 91,419 | 2.18 | 28.5 | 15.7 | 46.6 | 55.3 | 30.9 | 8.7 |
| Comparative Preparation Example 4 | 0.862 | 1.23 | 100,423 | 2.185 | 29.9 | 15.0 | 47.8 | 54.2 | 32.8 | 6.4 |
| Comparative Preparation Example 5 | 0.869 | 1.20 | 92,000 | 2.04 | 49.3 | 32.3 | 57.1 | 64.4 | 24.8 | 7.3 |
| Comparative Preparation Example 6 | 0.865 | 3.40 | 71,000 | 2.04 | 43.8 | 21.5 | 54.2 | 57.8 | 32.7 | 3.6 |
| Comparative Preparation Example 7 | 0.868 | 5.10 | 76,735 | 2.14 | 44.2 | 23.2 | 54.6 | 61.9 | 31.4 | 7.3 |

TABLE 3

| | Density (g/mL) | MI (g/10 min) | DSC Tm (° C.) | SSA T(90)-T(50) | T(95)-T(90) | Tensile strength | Tearing strength | Hardness (Shore A) |
|---|---|---|---|---|---|---|---|---|
| Preparation Example 1 | 0.862 | 1.20 | 32.1 | 35.1 | 16.5 | 2.2 | 29.5 | 55.0 |
| Comparative Preparation Example 1 | 0.861 | 1.32 | 39.7 | 28.3 | 6.2 | 2.1 | 25.6 | 56.7 |
| Comparative Preparation Example 2 | 0.861 | 1.12 | 28.6 | 31.3 | 8.9 | 1.6 | 22.4 | 52.9 |
| Comparative Preparation Example 3 | 0.862 | 1.20 | 28.5 | 30.9 | 8.7 | 1.3 | 16.7 | 51.6 |

When comparing the olefin-based polymer of Preparation Example 1 and the olefin-based polymer of Comparative Preparation Example 1, having the equivalent degrees of density and MI, FIG. 1 and FIG. 2 measured by DSC showed analogical tendency and similar graph types, and no significant difference was confirmed. However, in FIG. 3 and FIG. 4 measured by SSA, it could be confirmed that there was a significant difference in a high temperature region of 75° C. or more. Particularly, Preparation Example 1 showed peaks at 75° C. or more, but the Comparative Preparation Example did not show. Comparative Preparation Example 2 and Comparative Preparation Example 3 showed peaks in the corresponding region, but the sizes were small when compared with the Preparation Example. It could be found that due to the difference of melting in the high temperature region, Preparation Examples 1 to 5 satisfied T(90)-T(50) ≤50, also satisfied T(95)-T(90)≥10, and had wide values in T(95)-T(90) when compared with Comparative Preparation Examples 1 to 7.

Through Table 3, the mechanical strength of Preparation Example 1 and Comparative Preparation Examples 1, 2, and 3, having equivalent degrees of density and MI may be compared. It could be found that Preparation Example 1 introduced a polymer melted at a high temperature and showed increased mechanical rigidity, and thus, attained increased tensile strength and tearing strength when compared with Comparative Examples 1 to 3.

Preparation Examples 1 to 5 correspond to polymers obtained by polymerizing an olefin-based monomer by injecting a hydrogen gas and introducing a highly crystalline region. Accordingly, T(90)-T(50)≤50 is satisfied, T(95)-T(90)≥10 is also satisfied, and high mechanical rigidity is shown. It could be confirmed that the satisfaction or not of T(90)-T(50)≤50 and T(95)-T(90)≥10 and the mechanical rigidity could be changed according to the injection or not of the hydrogen gas and the injection amount thereof during polymerization, through comparing with Comparative Example 2 and Comparative Example 4.

Example 1: Preparation of Polypropylene-Based Composite

To 20 parts by weight of the olefin copolymer prepared in Preparation Example 1, 60 parts by weight of highly crystalline impact copolymer polypropylene (CB5230, Korea Petrochemical Industrial Co. Ltd.) having a melt index (230° C., 2.16 kg) of 30 g/10 min, and 20 parts by weight of talc (KCNAP_400™, Coats Co.) (average particle diameter (D50)=11.0 μm) were added, and then, 0.1 parts by weight of A01010 (Ciba Specialty Chemicals) as an antioxidant, 0.1 parts by weight of tris(2,4-di-tert-butylphenyl)phosphite (A0168), and 0.3 parts by weight of calcium stearate (Ca-St) were added. Then, the resultant mixture was melted and mulled using a twin screw extruder to prepare a polypropylene-based composite compound in a pellet shape. In this case, the twin screw extruder has a diameter of 25 Φ and a ratio of length to diameter of 40, and conditions were set to a barrel temperature of 200° C. to 230° C., a screw rotation velocity of 250 rpm, and an extrusion rate of 25 kr/hr.

Examples 2 to 5: Preparation of Polypropylene-Based Composites

Polypropylene-based composites were prepared by the same method as in Example 1 except for using the olefin copolymers shown in Table 4 below instead of the olefin copolymer prepared in Preparation Example 1. In this case, the type of polypropylene, and the ratio of olefin copolymer and polypropylene were changed in Example 5. In Table 4 below, polypropylene represented by CB5290 is highly crystalline impact copolymer polypropylene (CB5290, Korea Petrochemical Industrial Co. Ltd.) having a melt index (230° C., 2.16 kg) of 90 g/10 min.

Comparative Examples 1 to 7: Preparation of Polypropylene-Based Composites

Polypropylene-based composites were prepared by the same method as in Example 1 except for using the olefin copolymers shown in Table 4 below instead of the olefin copolymer prepared in Preparation Example 1. In this case, the type of polypropylene, and the ratio of olefin copolymer and polypropylene were changed in Comparative Example 7.

In Table 4 below, polypropylene represented by CB5290 is highly crystalline impact copolymer polypropylene (CB5290, Korea Petrochemical Industrial Co. Ltd.) having a melt index (230° C., 2.16 kg) of 90 g/10 min.

TABLE 4

| | | | Compounding ratio | | |
|---|---|---|---|---|---|
| | | | Olefin-based polymer (wt %) | PP (wt %) | Talc (wt %) |
| | Olefin-based polymer | polypropylene | | | |
| Example 1 | Preparation Example 1 | CB5230 | 20 | 60 | 20 |
| Example 2 | Preparation Example 3 | CB5230 | 20 | 60 | 20 |
| Example 3 | Preparation Example 4 | CB5230 | 20 | 60 | 20 |
| Example 4 | Preparation Example 5 | CB5230 | 20 | 60 | 20 |

TABLE 4-continued

|  | Olefin-based polymer | poly-propylene | Olefin-based polymer (wt %) | PP (wt %) | Talc (wt %) |
|---|---|---|---|---|---|
| Example 5 | Preparation Example 3 | CB5290 | 30 | 50 | 20 |
| Comparative Example 1 | Comparative Preparation Example 1 | CB5230 | 20 | 60 | 20 |
| Comparative Example 2 | Comparative Preparation Example 2 | CB5230 | 20 | 60 | 20 |
| Comparative Example 3 | Comparative Preparation Example 3 | CB5230 | 20 | 60 | 20 |
| Comparative Example 4 | Comparative Preparation Example 5 | CB5230 | 20 | 60 | 20 |
| Comparative Example 5 | Comparative Preparation Example 6 | CB5230 | 20 | 60 | 20 |
| Comparative Example 6 | Comparative Preparation Example 7 | CB5230 | 20 | 60 | 20 |
| Comparative Example 7 | Comparative Preparation Example 5 | CB5290 | 30 | 50 | 20 |

Experimental Example 2: Evaluation of Physical Properties of Polypropylene-Based Composite In order to confirm the physical properties of the polypropylene-based composites prepared in Examples 1 to 5, and Comparative Examples 1 to 7, specimens were manufactured by injection molding the polypropylene-based composites using an injection machine at a temperature of 230° C., and the specimens were stood in a constant temperature and humidity room for 1 day, and then, the specific gravity of polymers, the melt index of polymers, tensile strength, flexural strength and flexural modulus, impact strength at low temperature and room temperature, and contraction ratio were measured. The physical properties of the specimens thus manufactures are shown in Table 5 below.

1) Specific Gravity
Measurement was conducted according to ASTM D792.
2) Melt Index (MI) of Polymer
The melt index (MI) of a polymer was measured according to ASTM D-1238 (condition E, 230° C., 2.16 kg load).
3) Tensile Strength and Flexural Strength
Measurement was conducted using INSTRON 3365 apparatus according to ASTM D790.
4) Impact Strength at Low Temperature and at Room Temperature
Measurement was conducted according to ASTM D256, impact strength at room temperature was measured under room temperature (23° C.) conditions, and impact strength at low temperature was measured in a low-temperature chamber (−30° C.) after standing for 12 hours or more.

TABLE 5

|  | Specific gravity | MI (g/10 min) | Tensile strength | Flexural strength | Impact strength at low temperature | Impact strength at room temperature |
|---|---|---|---|---|---|---|
| Example 1 | 1.033 | 14.3 | 211 | 341 | 4.7 | 42.1 |
| Comparative Example 1 | 1.041 | 14.6 | 211 | 336 | 4.7 | 43.9 |
| Comparative Example 2 | 1.030 | 13.9 | 206 | 334 | 4.8 | 42.5 |
| Comparative Example 3 | 1.038 | 13.9 | 205 | 327 | 4.7 | 40.9 |
| Example 2 | 1.037 | 14.6 | 219 | 344 | 3.6 | 34.5 |
| Comparative Example 4 | 1.03 | 15.0 | 216 | 340 | 3.8 | 37.3 |
| Example 3 | 1.032 | 17.0 | 239 | 336 | 3.8 | 34.8 |
| Comparative Example 5 | 1.032 | 17.4 | 238 | 334 | 3.8 | 34.5 |
| Example 4 | 1.036 | 17.7 | 217 | 336 | 4.3 | 32.9 |
| Comparative Example 6 | 1.031 | 17.8 | 217 | 333 | 4.4 | 33.1 |
| Example 5 | 1.031 | 16.2 | 171 | 246 | 8.4 | 53.7 |
| Comparative Example 7 | 1.033 | 16.7 | 168 | 241 | 9.0 | 52.8 |

Referring to Table 5, when comparing the polypropylene-based composites including olefin-based copolymers having equivalent degrees of density and MI values, it could be confirmed that the polypropylene-based composites of the Examples maintained similar degrees of impact strength at low temperature and impact strength at room temperature, and improved mechanical strength such as tensile strength and flexural strength when compared with the polypropylene-based composites of the Comparative Examples. Through this, it could be confirmed that the mechanical rigidity of the polypropylene-based composite was improved by including an olefin-based copolymer introducing a highly crystalline region and showing high mechanical rigidity in the polypropylene-based composite of the Example.

The invention claimed is:
1. A polypropylene-based composite, comprising:
(A) polypropylene, and
(B) an olefin-based polymer satisfying the following conditions (1) to (3):
(1) a melt index (MI, 190° C., 2.16 kg load conditions) is from 0.1 g/10 min to 10.0 g/10 min,
(2) a density (d) is from 0.860 g/cc to 0.880 g/cc, and
(3) T (90)-T (50)≤50 and T (95)-T (90)≥10,
wherein T (50), T (90) and T (95) are temperatures at which 50%, 90%, and 95% of the olefin-based polymer are melted, respectively, when fractionating a temperature-heat capacity curve from measurement results by a differential scanning calorimetry precise measurement method (SSA).

2. The polypropylene-based composite according to claim 1, wherein the polypropylene has a melt index measured at 230° C. and 2.16 kg load of 0.5 g/10 min to 100 g/10 min.

3. The polypropylene-based composite according to claim 1, wherein the polypropylene is an impact copolymer having a melt index measured at 230° C. and 2.16 kg load of 0.5 g/10 min to 100 g/10 min.

4. The polypropylene-based composite according to claim 1, wherein the olefin-based polymer additionally satisfies the following condition: (4) a weight average molecular weight (Mw) is from 10,000 g/mol to 500,000 g/mol.

5. The polypropylene-based composite according to claim 1, wherein the olefin-based polymer additionally satisfies the following condition: (5) a molecular weight distribution (MWD) is from 0.1 to 6.0.

6. The polypropylene-based composite according to claim 1, wherein the olefin-based polymer additionally satisfies the following condition: (6) a melting temperature when measured by differential scanning calorimetry (DSC) is from 20° C. to 70° C.

7. The polypropylene-based composite according to claim 1, wherein the olefin-based polymer is a copolymer of ethylene and an alpha-olefin comonomer of 3 to 12 carbon atoms.

8. The polypropylene-based composite according to claim 7, wherein the alpha-olefin comonomer comprises any one of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or 1-eicosene, or mixtures of two or more thereof.

9. The polypropylene-based composite according to claim 1, wherein the olefin-based polymer is a copolymer of ethylene and 1-hexene.

10. The polypropylene-based composite according to claim 1, wherein the olefin-based polymer is obtained by a preparation method comprising: polymerizing an olefin monomer by injecting a hydrogen gas in the presence of a catalyst composition, the catalyst composition comprising a transition metal compound of Formula 1:

[Formula 1]

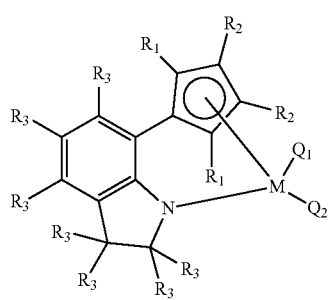

in Formula 1, $R_1$ groups are the same or different and each independently hydrogen, alkyl of 1 to 20 carbon atoms, alkenyl of 2 to 20 carbon atoms, aryl, silyl, alkylaryl, arylalkyl, or metalloid radical of a metal in group 4, which is substituted with hydrocarbyl, and two $R_1$ groups are optionally connected with each other by alkylidene radical containing alkyl of 1 to 20 carbon atoms or aryl radical of 6 to 20 carbon atoms to form a ring;

$R_2$ groups are the same or different and each independently hydrogen; halogen; alkyl of 1 to 20 carbon atoms; aryl; alkoxy; aryl oxy; or amido radical, and two $R_2$ groups are optionally connected with each other to form an aliphatic ring or an aromatic ring;

$R_3$ groups are the same or different and each independently hydrogen; halogen; alkyl of 1 to 20 carbon atoms; or a nitrogen-containing aliphatic or aromatic ring, which is unsubstituted or substituted with aryl radical, and two or more $R_3$ groups are optionally connected with each other to form an aliphatic or aromatic ring;

M is a transition metal in group 4; and $Q_1$ and $Q_2$ are each independently halogen; alkyl of 1 to 20 carbon atoms; alkenyl; aryl; alkylaryl; arylalkyl; alkyl amido of 1 to 20 carbon atoms; aryl amido; or alkylidene radical of 1 to 20 carbon atoms.

11. The polypropylene-based composite according to claim 1, wherein the olefin-based polymer is prepared by continuous solution polymerization reaction using a continuous stirred tank reactor by injecting hydrogen in the presence of a catalyst composition.

12. The polypropylene-based composite according to claim 1, wherein the polypropylene-based composite comprises the olefin-based polymer in an amount of 5 wt % to 40 wt %, based on a total amount of polypropylene-based composite.

13. The polypropylene-based composite according to claim 1, wherein the polypropylene-based composite additionally comprises an inorganic filler.

14. The polypropylene-based composite according to claim 13, wherein the polypropylene-based composite comprises the inorganic filler in an amount of 0.1 parts by weight to 40 parts by weight based on 100 parts by weight of the polypropylene, and the inorganic filler has an average particle diameter (D50) of 1 μm to 20 μm.

15. The polypropylene-based composite according to claim 1, wherein the polypropylene is any one selected from the group consisting of a polypropylene copolymer, a propylene-alpha-olefin copolymer, and a propylene-ethylene-alpha-olefin copolymer, or mixtures of two or more thereof.

16. The polypropylene-based composite according to claim 10, where the transition metal compound is represented by Formula 1-1:

[Formula 1-1]

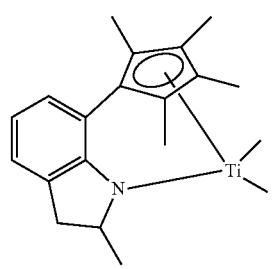

17. The polypropylene-based composite according to claim 10, wherein the hydrogen gas is injected in an amount of 0.35 to 3 parts by weight based on 1 part by weight of the olefin monomer.

* * * * *